(12) United States Patent
Pratapa et al.

(10) Patent No.: US 10,559,093 B2
(45) Date of Patent: Feb. 11, 2020

(54) SELECTING ENCODING OPTIONS

(71) Applicant: Arm Limited, Cambridge (GB)

(72) Inventors: Srihari Pratapa, Chapel Hill, NC (US); Hardik Sharma, Atlanta, GA (US); Thomas Jeremy Olson, San Jose, CA (US); Alexander Eugene Chalfin, Mountain View, CA (US)

(73) Assignee: Arm Limited, Cambridge (GB)

( * ) Notice: Subject to any disclaimer, the term of this patent is extended or adjusted under 35 U.S.C. 154(b) by 134 days.

(21) Appl. No.: 15/870,928

(22) Filed: Jan. 13, 2018

(65) Prior Publication Data

US 2019/0221006 A1  Jul. 18, 2019

(51) Int. Cl.
*G06T 9/00* (2006.01)
*G06N 3/08* (2006.01)
*G06T 11/00* (2006.01)

(52) U.S. Cl.
CPC ............ *G06T 9/002* (2013.01); *G06N 3/082* (2013.01); *G06N 3/084* (2013.01); *G06T 11/001* (2013.01)

(58) Field of Classification Search
CPC ......... G06T 9/00; G06T 11/001; G06T 9/005; H04N 19/90
See application file for complete search history.

(56) References Cited

U.S. PATENT DOCUMENTS

| 10,318,891 B1* | 6/2019 | Hemmer | G06T 9/00 |
| 2009/0021521 A1* | 1/2009 | Sorgard | G06T 9/00 345/582 |
| 2012/0281005 A1 | 11/2012 | Nystad | |
| 2012/0281006 A1 | 11/2012 | Nystad | |
| 2012/0281007 A1 | 11/2012 | Nystad | |
| 2012/0281925 A1 | 11/2012 | Nystad | |
| 2015/0228050 A1 | 8/2015 | Nystad | |
| 2015/0235384 A1 | 8/2015 | Nystad | |
| 2017/0264902 A1* | 9/2017 | Ye | H04N 19/124 |
| 2018/0124422 A1* | 5/2018 | Van Leuven | H04N 19/176 |

FOREIGN PATENT DOCUMENTS

| CN | 105306947 | 2/2016 |
| EP | 3499890 | 6/2019 |
| WO | 2004/104930 | 12/2004 |

OTHER PUBLICATIONS

GB Combined Search and Examination Report dated Jul. 8, 2019, GB Application No. GB1900346.6.
Liu, et al., "CU Partition Mode Decision for HEVC Hardwired Intra Encoder Using Convolution Neural Network," IEEE Transactions on Image Processing (vol. 25, Issue: 11, Nov. 2016) 5088-5103, Available at DOI: 10.1109/TIP.2016.20601264.

* cited by examiner

*Primary Examiner* — Ross Varndell
(74) *Attorney, Agent, or Firm* — Vierra Magen Margus LLP

(57) ABSTRACT

A data processing apparatus implements an artificial neural network to generate a result that indicates one or more encoding options to use when encoding a set of data elements using an encoding scheme. The data processing apparatus can provide an efficient way of selecting between possible encoding options that can be used to encode a set of data elements.

17 Claims, 4 Drawing Sheets

SELECTING ENCODING OPTIONS

BACKGROUND

The technology described herein relates to selecting one or more encoding options to use when encoding a set of data elements using an encoding scheme.

It is common to encode a set of data elements, such as an array of data elements representing an image or graphics texture, using an encoding scheme, for example so as to reduce the amount of bandwidth and/or storage needed to transfer and/or store the data. Many different encoding schemes are available for this purpose. Some encoding schemes require certain encoding options to be selected for the data to be encoded that can provide acceptable (e.g. optimal or near optimal) encoding, for example in terms of compression ratio and/or quality of the subsequently decoded data. The selected encoding options can then be used when encoding the data. The process of selecting between encoding options to use is typically performed by brute force and/or heuristically, e.g. using a branch-and-bound search. However, this process can consume significant amounts of processing resources and/or processing time to complete.

The Applicants believe that there remains scope for improvements in selecting one or more encoding options to use when encoding a set of data elements using an encoding scheme.

BRIEF DESCRIPTION OF THE DRAWINGS

Various embodiments of the technology described herein will be described by way of example only and with reference to the accompanying drawings, in which.

Figure 1:
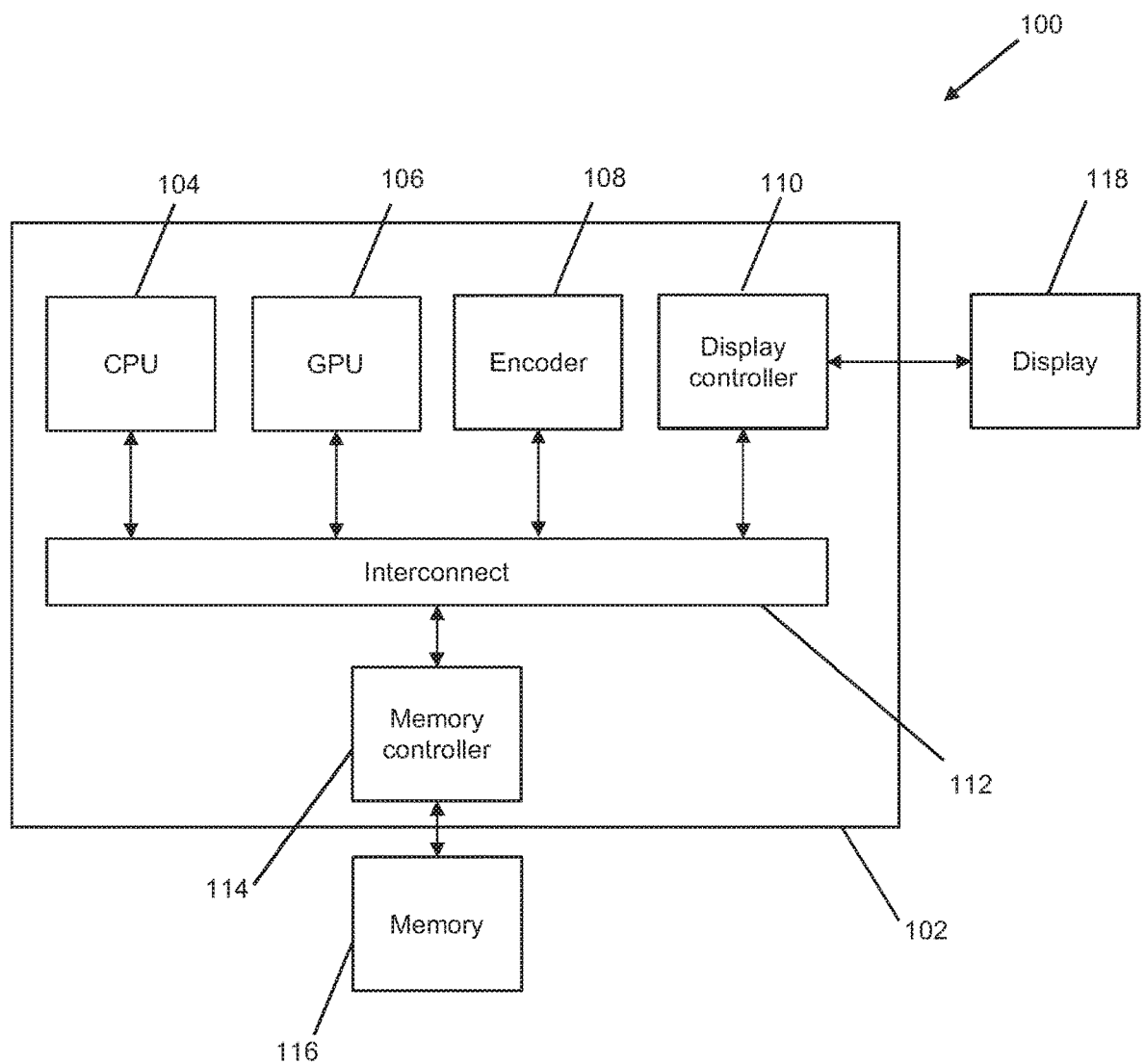
FIG. 1 shows schematically a data processing system comprising a data processing apparatus that can encode a set of data elements using an encoding scheme according to an embodiment of the technology described herein.

The drawings show elements of a data processing apparatus and system that are relevant to embodiments of the technology described herein. As will be appreciated by those skilled in the art, there may be other elements of the data processing apparatus and system that are not illustrated in the drawings. It should also be noted here that the drawings are only schematic, and that, for example, in practice the shown elements may share significant hardware circuits, even though they are shown schematically as separate elements in the drawings. Like reference numerals are used for like elements where appropriate in the drawings.

DETAILED DESCRIPTION

An embodiment of the technology described herein comprises a method of selecting one or more encoding options to use when encoding a set of data elements using an encoding scheme, the method comprising:

inputting, to an artificial neural network, a set of data elements to be encoded using an encoding scheme; and implementing the artificial neural network to generate a result that indicates one or more encoding options to use when encoding the set of data elements using the encoding scheme.

Another embodiment of the technology described herein comprises a data processing apparatus for selecting one or more encoding options to use when encoding a set of data elements using an encoding scheme, the apparatus comprising processing circuitry configured to:

input, to an artificial neural network, a set of data elements to be encoded using an encoding scheme; and implement the artificial neural network to generate a result that indicates one or more encoding options to use when encoding the set of data elements using the encoding scheme.

As discussed above, the Applicants have recognised that, in many encoding schemes, one or more encoding options must be selected for encoding a set of data elements. For example, and as will be discussed in more detail below, in encoding schemes in which data elements can be partitioned into distinct subsets or "partitions" of data elements for respective encoding, it is typically necessary to consider how well the data elements can be encoded using a large number of different possible ways in which to partition the data elements, and then to select an acceptable (e.g. an optimal or near optimal) manner of partitioning. In another example, and as will be discussed in more detail below, in encoding schemes in which data elements can be encoded using different interpolation modes (e.g. using one or two weight values), it is typically necessary to consider each interpolation mode, and then to select an acceptable (e.g. an optimal or near optimal) interpolation mode for encoding the data elements. In yet another example, and as will be discussed in more detail below, in encoding schemes in which data elements can be encoded using (e.g. one or more pairs of) interpolation endpoint values, it is typically necessary to consider a large number of (e.g. pairs of) possible interpolation endpoint values, and then to select acceptable (e.g. optimal or near optimal) interpolation endpoint values for encoding the data elements.

The Applicants have further recognised that the determination of an acceptable set of encoding options (e.g. one or more of the encoding options discussed above) to use when applying an encoding scheme to a set of data elements can be a computationally expensive process. The Applicants have further identified that an artificial neural network can be used, and e.g. suitably trained, to indicate one or more encoding options to use, and moreover that the use of such an artificial neural network can significantly reduce the amount of processing time and/or processing resources needed to select the one or more encoding options to use without adversely affecting, and on the contrary in some cases improving, the quality of the encoded and/or subsequently decoded data. The technology disclosed herein can therefore provide an efficient way of selecting between possible encoding options that can be used to encode a set of data elements.

In embodiments, the indication of the one or more encoding options to use can then be output for future use and/or one or more of the indicated encoding options can then be used to encode the set of data elements. Thus, embodiments may comprise outputting the indication of the one or more encoding options and/or using one or more of the indicated encoding options when encoding the set of data elements using the encoding scheme.

In embodiments, the artificial neural network may take any desired and suitable form or "network topology". The artificial neural network may, for example, comprise one or more fully connected networks including one or more activation layers, such as an input layer that receives an input (e.g. the input set of data elements), one or more intermediate or "hidden" layers, and an output layer that provides a result (e.g. the indication of the one or more encoding options to use).

An (and e.g. each) activation layer may comprise one or more (e.g. plural) activation nodes that each apply an activation function, such as a Sigmoid, Rectified Linear Unit (ReLU) or Scaled Exponential Linear Unit (SELU) function and/or apply a bias.

One or more activation nodes (e.g. each activation node) of an activation layer may be connected to one or more nodes (e.g. each activation node) of another (e.g. the next) layer, and so on, by a respective interconnection. A (e.g. respective) weight value may be applied to a (and e.g. each) value provided on the input side of an interconnection to produce a weighted value on the output side of the interconnection. One or more (e.g. summed and/or weighted and/or biased) values may be provided as an input to an activation function that is applied at an activation node.

In embodiments, the artificial neural network may also or instead comprise a convolutional neural network, for example having one or more convolutional layers (e.g. that each apply one or more convolution operations to generate an output for the layer), one or more pooling layers (e.g. that each pool or aggregate sets of input values to generate an output from the layer), and/or one or more fully connected networks (e.g. comprising one or more activation layers as discussed above).

In embodiments, the set of data elements may take any desired and suitable form. For example, the set of data elements may be provided as an array (e.g. block) of data elements. The array of data elements can be any desired and suitable size/shape in terms of data elements, such as rectangular (including square). In embodiments, the data elements may each represent one or more data values, such as one or more image or graphics data values (colour, luminance and/or transparency values). Thus, the set of data elements may represent all or part of an image or graphics texture (e.g. to be output for storage and/or display). For example, a data element may correspond to one or more pixels in an image or one or more texels in a graphics texture, and/or a pixel in an image or texel in a graphics texture may be represented by one or more data elements.

In embodiments, the encoding scheme may take any desired and suitable form. For example, the encoding scheme may comprise a data compression scheme. The encoding scheme may comprise an image or graphics texture encoding (compression) scheme. The encoding scheme may be used for any desired and suitable purpose, for example encoding (compressing) all or part of an image or graphics texture (e.g. to be output for storage and/or display).

In embodiments, the encoding scheme may allow selected encoded data elements or values to be derived from the resultant encoded data without decoding all of the encoded data. These embodiments can allow selected decoded data elements or values to be accessed and/or processed separately from other data elements or values. These embodiments can therefore significantly reduce the amount of processing resources needed, for example when it is desired to access or process only selected data elements or values. In embodiments, the encoding scheme may allow substantially random access to selected data elements or values from the encoded data. In embodiments, the encoding scheme may comprise a substantially parallel (or substantially non-sequential) encoding scheme that can encode data elements or values substantially in parallel (or substantially non-sequentially).

In embodiments, the encoding scheme may be block-based. In these embodiments, using the encoding scheme to encode the set of data elements may comprise dividing a (e.g. larger) set or array of data elements (e.g. representing all or part of an image or graphics texture, such as a rendered graphics output ("tile" and/or "frame")) into plural blocks of data elements, and then encoding the plural blocks of data elements separately using the encoding scheme. The selected data elements or values that can be decoded may then be the data elements or values of one or more such blocks.

In embodiments, a block of data elements can be any desired and suitable size/shape in terms of data elements, such as rectangular (including square). The blocks of data elements may be non-overlapping. The blocks may be M×N data elements in size/shape, where M and N may be between 4 and 12.

The encoded blocks may be the same or may differ in respect of size/shape (e.g. in terms of data elements). The encoded blocks may be the same or may differ in respect of encoded data bit rate (e.g. bits per encoded data element). However, the encoded blocks may have the same (fixed) data size (e.g. in terms of bits or bytes). For example, the encoded blocks may each be 128 bits in data size. For example, a larger block (e.g. in terms of data elements) may have a lower bit rate (e.g. bits per encoded data element) and/or a smaller block (e.g. in terms of data elements) may have a higher bit rate (e.g. bits per encoded data element). The (e.g. larger) set or array of data elements can also be any desired and suitable size, shape or configuration in terms of such blocks.

In embodiments, the encoding scheme may allow the set of data elements to be partitioned into selected one or more (e.g. distinct) subsets or "partitions" of data elements for respective encoding. There may be any desired and suitable number of subsets or partitions into which the set of data elements can be partitioned. For example, the set of data elements may be partitioned into 1, 2, 3 or 4 subsets or partitions. It should be noted here that, when there is only one subset or partition for the set of data elements, the set of data elements are not, in fact, divided between plural distinct subsets or partitions, but the set of data elements is nevertheless still considered to be "partitioned" into that single subset or partition.

As discussed above, the encoding scheme may be block-based. A subset or partition of the data elements may comprise data elements from one or more blocks of data elements. Thus, in embodiments, a subset or partition of data elements may comprise data elements from one or more blocks of data elements and/or a block may comprise data elements for one or more subsets or partitions.

The manner in which the set of data elements is partitioned may be indicated by a "partition count" that indicates the number of subsets or partitions used for the set of data elements. For example, the partition count may be an integer, e.g. in the range 1 to 4. The manner in which the set of data elements is partitioned may also or instead be indicated, e.g. for a particular partition count (other than 1), by a "partition index" that indicates which data elements belong to which partition. The partition index may be an integer, e.g. in the range 0-1023.

In these embodiments, the encoded data may accordingly indicate the manner in which the set of data elements was partitioned. For example, the encoded data may indicate a partition count and/or a partition index for the encoded data. A function, such as a hash function, may then be used to determine, e.g. from the partition count, partition index, and/or a position for a data element (e.g. the data element's indexed location in the set or array), the particular partition to which the data element belongs.

Thus, as discussed above, indicating the one or more encoding options may comprise indicating the manner in which to partition the set of data elements. For example, indicating the one or more encoding options may comprise indicating a partition count and/or a partition index for the set of data elements.

In embodiments in which the set of data elements is partitioned into plural distinct subsets or partitions, using the encoding scheme to encode the set of data elements may comprise using selected one or more further encoding options that are different for the respective subsets or partitions of data elements. These embodiments can allow one or more further encoding options that are used to encode a subset or partition of data elements to be better tailored for that subset or partition of data elements.

In embodiments, the further encoding options for the respective subsets or partitions of data elements may differ in respect of interpolation mode (e.g. the number of weight values (e.g. one or two weight values) used to interpolate to the data elements or values of the subset or partition) and/or interpolation endpoint values (e.g. the interpolation endpoint values used to interpolate to the data elements or values of the subset or partition). An interpolation mode and/or one or more (e.g. pairs of) interpolation endpoints may therefore be selected for each partition.

In embodiments, the encoding scheme may also or instead allow a selected one of plural (e.g. two) different interpolation modes to be used for encoding the set of data elements. In these embodiments, the encoded data may accordingly indicate one or more interpolation modes used for the encoded data (e.g. a number of interpolation weight values (e.g. one or two weight values) used to interpolate to the data elements or values of the set). Thus, as discussed above, indicating the one or more encoding options may comprise indicating one or more interpolation modes to use for encoding the set of data elements (e.g. the number of weights (e.g. one or two weights) to use to interpolate to the data elements or values of the set).

In embodiments, the encoding scheme may also or instead allow selected (e.g. one or more pairs of) endpoint values to be used for interpolating to a data value of the set of data elements. In embodiments, the encoded data may accordingly indicate one or more (e.g. pairs of) endpoint values used for the encoded data. Thus, as discussed above, indicating the one or more encoding options may comprise indicating one or more (e.g. pairs of) endpoint values for interpolating to a data element or value of the set of data elements.

In embodiments, using the encoding scheme to encode the set of data elements may also or instead comprise determining one or more (e.g. one or two) weight values for a data element to use to interpolate to one or more data values of that data element. Thus, in embodiments, the encoded data may comprise a set of weight values for the set of data elements.

In embodiments, the encoding scheme may be a lossy encoding scheme. In other embodiments, the encoding scheme may be lossless or at least substantially lossless.

In embodiments, the encoding scheme may comprise Block Compression 6 (BC6), Block Compression 7 (BC7), or adaptive scalable texture compression (ASTC), all of which allow partitioning to be used when encoding a set of data elements. ASTC is described, for example, in US 2012/0281007, US 2015/0235384, US 2012/0281006, US 2012/0281005, US 2015/0228050 and US 2012/0281925, the entire contents of which are incorporated herein by reference.

The one or more encoding options that are indicated may accordingly relate to any desired and suitable encoding options (e.g. parameters) to be considered and selected for encoding. For example, as discussed above, the one or more encoding options may relate to one or more of: the manner in which to partition the set of data elements for respective encoding; one or more interpolation modes for encoding the set of data elements; and one or more (e.g. pairs of) interpolation endpoint values for encoding the set of data elements. The indicated one or more encoding options can then be used when encoding the set of data element, e.g. when determining one or more weight values for a data element to use to interpolate to one or more data values of that data element.

The result that indicates the one or more encoding options may accordingly take any desired and suitable form. For example, the result may comprise a set of one or more output values or "scores" (e.g. an output value for each encoding option under consideration). For example, the result may comprise an output value or "score" for each one of plural possible manners in which to partition the set of data elements for respective encoding (e.g. an output value or "score" for each partition count and/or partition index (combination) being considered). The result may be non-binary, e.g. comprised of one or more output values or scores between 0 and 1. One or more encoding options indicated as having an acceptable output value or score may be selected, considered further and/or used for encoding the set of data elements. An output value or score may be considered acceptable when that output value or score is a highest score or a score above a particular threshold. Alternatively, depending on the manner in which the artificial neural network is trained to generate the result, an acceptable output value or score may be a lowest score or a score below a particular threshold, or a score that is closest or sufficiently close to (below a threshold distance from) a particular score.

In embodiments, the artificial neural network may be used to indicate and select some but not all of the encoding options for encoding the set of data elements using the encoding scheme, with any remaining encoding options being selected in a manner other than via the artificial neural network, such as via a separate artificial neural network, using brute force, and/or heuristically, e.g. using a branch-and-bound search.

The remaining one or more encoding options may be selected as a result of, or based on, the one or more encoding options previously indicated by the artificial neural network. For example, when one or more manners in which to partition the set of data elements for respective encoding has been indicated via the artificial neural network, the remaining one or more encoding options may then be selected with the one or more indicated manners of partitioning applied, e.g. via a separate artificial neural network, using brute force, and/or heuristically, e.g. using a branch-and-bound search. A final set of encoding options to use that provides acceptable (e.g. optimal or near optimal) encoding may then be selected as a result of this overall selection process.

In embodiments in which the indicated one or more encoding options are used to encode the set of data elements, and thereby generate encoded data, the encoded data may then be used in any desired and suitable way. Embodiments may, for example, comprise writing out the encoded data, e.g. for storage or transfer within or outside of the data processing apparatus. Embodiments may comprise later reading in at least some or all of the encoded data, e.g. from storage or transfer within or outside of the data processing apparatus. Embodiments may further comprise using a decoding scheme to derive decoded data elements or values from the encoded data.

The decoding scheme can take any desired and suitable form that corresponds to (e.g. is the inverse of or is complementary to) the encoding scheme, as discussed above. For example, the decoding scheme may allow selected data elements or values to be derived from the encoded data without decoding all of the encoded data. For another example, the decoding scheme may be block-based. In these embodiments, using the decoding scheme to derive the decoded data elements or values may comprise decoding data elements or values for one or more blocks separately and/or in parallel using the decoding scheme. For another example, using the decoding scheme to derive the decoded data elements or values from the encoded data may comprise using different decoding options (e.g. parameters) for deriving selected data elements or values belonging to respective subsets or partitions of data elements.

The decoding process for a data element or value may, for example, comprise determining, e.g. from a partition count, partition index, and/or data element position (e.g. indexed location in the set or array), the particular partition to which the data element or value belongs. The decoding process for a data element or value may also or instead comprise determining, e.g. for the particular partition, the interpolation mode and/or one or more (e.g. pairs of) interpolation endpoints to use. The decoding process for a data element or value may also or instead comprise using one or more weight values for the data element to determine one or more values for the data element, e.g. using the determined interpolation mode and/or one or more (e.g. pairs of) interpolation endpoints.

As will be appreciated, any of the above described processes that are performed in respect of a set (e.g. array or block) of data elements (e.g. indicating and/or selecting one or more encoding options for use when encoding the set of data elements and/or encoding the set of data elements using one or more indicated and/or selected encoding options) may, in practice, be performed respectively for each (e.g. every) one of plural sets (e.g. arrays or blocks) of data elements.

The technology described herein also extends to training an artificial neural network to be able to indicate one or more encoding options to use when encoding a set of data elements using an encoding scheme. Thus, embodiments may further comprise training the artificial neural network to be able to indicate one or more encoding options to use when encoding a set of data elements using the encoding scheme.

The training may comprise, for each particular training set of data elements of plural training sets of data elements: inputting, to the artificial neural network, the particular training set of data elements; implementing the artificial neural network to generate a result that indicates one or more encoding options to use when encoding the particular training set of data elements using the encoding scheme; and determining an output error metric for the particular training set of data elements based on a difference between the result and a target result for the particular training set of data elements. The training may further comprise modifying the artificial neural network so as to reduce a collated output error metric derived from the output error metrics for the plural training sets of data elements.

In embodiments, the data processing apparatus that is used to train the artificial neural network may be the same data processing apparatus that is used to indicate one or more encoding options to use when encoding a set of data elements using the encoding scheme. However, in other embodiments, and more typically, the data processing apparatus that is used to train the artificial neural network may be different to the data processing apparatus that is used to indicate one or more encoding options to use when encoding a set of data elements using the encoding scheme. For example, a "training" data processing apparatus may be used to train the artificial neural network to indicate one or more encoding options, but an "encoding" data processing apparatus may be used to implement the (previously trained) artificial neural network to indicate one or more encoding options to use. In these embodiments, the artificial neural network may be trained by the "training" data processing apparatus and provided to the "encoding" data processing apparatus, for example as a set of artificial neural network parameters (e.g. that indicate the network topology, activation functions, weight values, and/or bias values, etc., to use for the artificial neural network).

Thus, another embodiment of the technology described herein comprises a method of training an artificial neural network to be able to indicate one or more encoding options to use when encoding a set of data elements using an encoding scheme, the training comprising:

for each particular training set of data elements of plural training sets of data elements:
  inputting, to an artificial neural network, the particular training set of data elements;
  implementing the artificial neural network to generate a result that indicates one or more encoding options to use when encoding the particular training set of data elements using an encoding scheme; and
  determining an output error metric for the particular training set of data elements based on a difference between the result and a target result for the particular training set of data elements; and
modifying the artificial neural network so as to reduce a collated output error metric derived from the output error metrics for the plural training sets of data elements.

Another embodiment of the technology described herein comprises a data processing apparatus for training an artificial neural network to be able to indicate one or more encoding options to use when encoding a set of data elements using an encoding scheme, the data processing apparatus comprising processing circuitry configured to:

for each particular training set of data elements of plural training sets of data elements:
  input, to an artificial neural network, the particular training set of data elements;
  implement the artificial neural network to generate a result that indicates one or more encoding options to use when encoding the particular training set of data elements using an encoding scheme; and
  determine an output error metric for the particular training set of data elements based on a difference between the result and a target result for the particular training set of data elements; and modify the artificial neural network so as to reduce a collated output error metric derived from the output error metrics for the plural training sets of data elements.

These embodiments may include one or more or all of the optional features described herein as appropriate. For example, the modified (trained) artificial neural network may be able to, and may subsequently be implemented to, generate a result that indicates one or more encoding options for use when applying the encoding scheme to a set of data elements in a manner as discussed herein in any embodiment.

In any of the embodiments in which the artificial neural network is trained, the training sets of data elements may take any desired and suitable form, for example that corresponds to a set of data elements that will be input into the modified (trained) artificial neural network. Any desired and suitable (e.g. large) number of training sets of data elements, such as hundreds or thousands of training sets of data elements, may be used for the training.

In embodiments, the error metric may take any desired and suitable form. For example, the error metric may be, or be based on, a summed and/or squared difference between the result (one or more output values or "scores") generated for the particular training set of data elements and a target result (one or more target output values or "scores") for the particular training set of data elements.

A target result for a particular training set of data elements may take any desired and suitable form that the result that indicates one or more encoding options may have, for example as discussed above. However, the target result may be binary, e.g. comprised of one or more 0s and 1s (e.g. indicating one or more target (e.g. optimal or near optimal) encoding options), whereas the result may be non-binary, e.g. comprised of one or more output values between 0 and 1.

As will be appreciated, a target result for a particular training set of data elements should correspond to a desired, or at least acceptable, result for the particular training set of data elements in question. The target result for the particular training set of data elements in question may, for example, have been selected in a manner other than via an artificial neural network, such using brute force and/or heuristically, e.g. using a branch-and-bound search.

The Applicants have further recognised that solely using error metrics based on differences between results and target results at the output of an artificial neural network may not always converge to a suitably trained artificial neural network and/or may require a significant amount of processing resources and/or processing time to converge to a suitably trained artificial neural network.

In this regard, in embodiments, an intermediate error metric may also be determined that is based on a difference between an intermediate result at an intermediate or "hidden" layer of the artificial neural network and a target intermediate result for the particular training set of data elements. Thus, in embodiments, the training may further comprise determining an intermediate error metric for each particular training input that is based on a difference between an intermediate result at an intermediate layer of the artificial neural network and a target intermediate result for the particular training input. Embodiments may then further comprise modifying the artificial neural network so as to reduce a collated intermediate error metric derived from the intermediate error metrics for the plural training inputs.

The Applicants have identified that using an intermediate result in this way can help the training process to converge to a suitably trained artificial neural network and/or reduce the amount of processing resources and/or processing time required to converge to a suitably trained artificial neural network. The Applicants have also identified that this technique can be beneficial in many contexts, other than those discussed above, where there may exist intermediate results that can help to "guide" the artificial neural network to generate a desired, or at least acceptable, result at the output. Indeed, this technique is considered to be new and advantageous in its own right, and not merely in the context of the other embodiments described herein.

Thus, another embodiment of the technology described herein comprises a method of training an artificial neural network, the training comprising:

for each particular training input of plural training inputs:
inputting, to an artificial neural network, the particular training input;
implementing the artificial neural network to generate a result; and
determining an output error metric for the particular training input based on a difference between the result and a target result for the particular input; and
determining an intermediate error metric for the particular training input based on a difference between an intermediate result at an intermediate layer of the artificial neural network and a target intermediate result for the particular input; and modifying the artificial neural network so as to reduce a collated output error metric derived from the output error metrics for the plural training inputs and so as to reduce a collated intermediate error metric derived from the intermediate error metrics for the plural training inputs.

Another embodiment of the technology described herein comprises a data processing apparatus for training an artificial neural network, the data processing apparatus comprising processing circuitry configured to:

for each particular training input of plural training inputs:
input, to an artificial neural network, the particular training input;
implement the artificial neural network to generate a result; and
determine an output error metric for the particular training input based on a difference between the result and a target result for the particular input; and
determine an intermediate error metric for the particular training input based on a difference between an intermediate result at an intermediate layer of the artificial neural network and a target intermediate result for the particular input; and modify the artificial neural network so as to reduce a collated output error metric derived from the output error metrics for the plural training inputs and reduce a collated intermediate error metric derived from the intermediate error metrics for the plural training inputs.

These embodiments may include one or more or all of the optional features described herein as appropriate. For example, as discussed above, the training inputs may comprise training sets of data elements, for example as discussed herein in any embodiment. Similarly, the results may comprise one or more output values or "scores" and/or may indicate one or more encoding options to use when encoding the particular training set of data elements using an encoding scheme, for example as discussed herein in any embodiment. Furthermore, the modified (trained) artificial neural network may be able to, and may subsequently be implemented to, generate a result for output and/or use as desired, for example for encoding a set of data elements in a manner as discussed herein in any embodiment.

In embodiments, the intermediate error metric may take any desired and suitable form. For example, the intermediate error metric may be, or be based on, a summed and/or squared difference between the intermediate result (one or more intermediate values or "scores") generated for the particular input and a target intermediate result (one or more target intermediate values or "scores") for the particular input.

An intermediate target result for a particular input may take any desired and suitable form that may help to produce a desired, or at least acceptable, output result. The intermediate target result may be binary, e.g. comprised of one or more 0s and 1s (e.g. corresponding to a target intermediate result and/or target output result, such as one or more target (e.g. optimal or near optimal) encoding options, for the particular input), whereas the intermediate result itself may be non-binary, e.g. comprised of one or more intermediate values between 0 and 1.

Thus, an intermediate target result for a particular input may correspond to a desired, or at least acceptable, intermediate result and/or output result for the particular training input. For example, where the output result indicates a manner in which to partition a set of data elements for respective encoding (e.g. indicates a partition count and/or partition index (combination)), the intermediate target result may comprise a set of intermediate values (e.g. a bit map) corresponding to a target manner in which to partition a set of data elements for respective encoding. The target intermediate result and/or target output result for the particular training input may be determined in a manner other than via an artificial neural network, such as using brute force and/or heuristically, e.g. using a branch-and-bound search.

In any of the embodiments in which the artificial neural network is trained, modifying the artificial neural network so as to reduce the collated output error metric and/or collated intermediate error metric may be performed in any desired and suitable way, e.g. using gradient descent for a collated output error metric function and/or a collated intermediate error metric function, such as a combined or "dual loss" error function.

For example, in embodiments, modifying the artificial neural network may comprise back-propagation of the collated output error metric and/or back-propagation of the collated intermediate error metric, or back-propagation of combinations thereof. For example, the collated output error metric may be back-propagated to the intermediate layer, combined with (e.g. added to) the collated intermediate error metric, and the combined or "dual loss" error may be back-propagated from the intermediate layer, e.g. to the input layer.

In any of the embodiments in which the artificial neural network is trained, modifying the artificial neural network may comprise adjusting the weight values and/or bias values that are applied in the artificial neural network, e.g. based on back-propagation of the collated output error metric and/or the collated intermediate error metric, or combinations thereof.

As will be appreciated, the overall training process for the artificial neural network may comprise one or more iterations of the training process described above, for example in which, for each iteration of the training process, the artificial neural network is modified based on a (e.g. different) group or "batch" of plural training inputs and their corresponding target results.

The processing described herein in any embodiment may be performed by any desired and suitable data processing apparatus and/or part thereof. For example, at least some of the processing described herein may be performed by a central processor (CPU), a graphics processor (GPU), an image processor, a (dedicated) encoding processor (encoder), and/or a (dedicated) artificial neural network processor. The ("encoding" and/or "training") data processing apparatus may therefore comprise or may be a central processor (CPU), a graphics processor (GPU), an image processor, a (dedicated) encoding processor (encoder), and/or a (dedicated) artificial neural network processor. Thus, at least some of the processing circuitry described herein may form part of a central processor (CPU), a graphics processor (GPU), an image processor, a (dedicated) encoding processor (encoder), and/or a (dedicated) artificial neural network processor.

The ("encoding" and/or "training") data processing apparatus may comprise, or may be, or may form part of, a system on chip (SoC) or a distributed (multi-chip) system. In an embodiment, the various functions of the technology described herein are carried out on a single data processing platform.

As will be appreciated by those skilled in the art, the ("encoding" and/or "training") data processing apparatus described herein may be part of an overall data processing system that includes, for example, a host (e.g. central) processor, memory, etc. The host processor may, for example, execute applications that require data processing by the data processing apparatus. The host processor may send appropriate commands and data to control the data processing apparatus to perform data processing and to generate and/or use a result required by applications executing on the host processor. To facilitate this, the host processor may execute a driver for the data processing apparatus and/or may execute a compiler or compilers for compiling programs to be executed by a programmable execution unit of the data processing apparatus.

In embodiments, the apparatus may comprise a memory (storage) controller configured to read in and/or write back the set of data elements, the encoded data and/or the artificial neural network parameters from and/or to memory (storage). The memory may be any desired and suitable memory of or for the data processing apparatus. The memory may be external to the one or more processors of or for the data processing apparatus, such as a central processor, graphics processor, image processor, encoding processor and/or artificial neural network processor. The memory may be external to the data processing apparatus. The memory may be, for example, main system memory.

In embodiments, the apparatus or system may comprise, and/or may be in communication with, one or more memories and/or memory devices that store the data described herein, and/or store software for performing the processes described herein. The apparatus or system may comprise, and/or may be in communication with a display for displaying an (e.g. rendered) output (e.g. all or part of an image or graphics texture) based on the data processing.

The technology described herein can be implemented in any suitable apparatus or system, such as a suitably configured computer or micro-processor based apparatus or system. In an embodiment, the technology described herein is implemented in a computer and/or micro-processor based apparatus or system.

The various functions of the technology described herein can be carried out in any desired and suitable manner. For example, the steps and functions of the technology described herein can be implemented in hardware or software, as desired. Thus, for example, unless otherwise indicated, the various circuitry, functional elements, stages, and "means"

of the technology described herein may comprise a suitable processor or processors, controller or controllers, functional units, circuitry, processing logic, microprocessor arrangements, etc., that are operable to perform the various steps or functions, etc., such as appropriately dedicated hardware elements (processing circuitry) and/or programmable hardware elements (processing circuitry) that can be programmed to operate in the desired manner.

The various steps or functions, etc., of the technology described herein may be duplicated and/or carried out in parallel on a given processor. Equally, the various processing stages may share processing circuitry, etc., if desired.

Subject to any hardware necessary to carry out the specific steps or functions, etc., discussed above, the apparatus or system can otherwise include any one or more or all of the usual functional units, etc., that data processing apparatus or systems include.

The various data processing stages can be implemented as desired and in any suitable manner, and can perform any desired and suitable functions, respectively. Similarly, the various data can be defined and stored in any suitable and desired manner.

It will also be appreciated by those skilled in the art that all of the described embodiments of the technology described herein can, and in an embodiment do, include, as appropriate, any one or more or all of the features described herein.

The methods in accordance with the technology described herein may be implemented at least partially using software e.g. computer programs. Thus, further embodiments comprise computer software specifically adapted to carry out the methods herein described when installed on a data processor, a computer program element comprising computer software code portions for performing the methods herein described when the program element is run on a data processor, and a computer program comprising code adapted to perform all the steps of a method or of the methods herein described when the program is run on a data processor. The data processor may be a microprocessor system, a programmable FPGA (field programmable gate array), etc.

The technology described herein also extends to a computer software carrier comprising such software which when used to operate a data processing apparatus, data processor, renderer or microprocessor system comprising a data processor causes in conjunction with said data processor said apparatus, processor, renderer or system to carry out the steps of the methods of the technology described herein. Such a computer software carrier could be a physical storage medium such as a ROM chip, CD ROM, RAM, flash memory, or disk, or could be a signal such as an electronic signal over wires, an optical signal or a radio signal such as to a satellite or the like.

It will further be appreciated that not all steps of the methods of the technology described herein need be carried out by computer software and thus further embodiments comprise computer software and such software installed on a computer software carrier for carrying out at least one of the steps of the methods set out herein.

The technology described herein may suitably be embodied as a computer program product for use with a computer system. Such an implementation may comprise a series of computer readable instructions either fixed on a tangible, non transitory medium, such as a computer readable medium, for example, diskette, CD, DVD, ROM, RAM, flash memory, or hard disk. It could also comprise a series of computer readable instructions transmittable to a computer system, via a modem or other interface device, either over a tangible medium, including but not limited to optical or analogue communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink wrapped software, pre loaded with a computer system, for example, on a system ROM or fixed disk, or distributed from a server or electronic bulletin board over a network, for example, the Internet or World Wide Web.

As is discussed above, embodiments of the technology described herein relate to arrangements in which an artificial neural network is implemented to generate a result that indicates one or more encoding options to use when encoding a set of data elements using an encoding scheme. This can provide an efficient way of selecting between possible encoding options that can be used to encode a set of data elements.

Various embodiments of the technology described herein will now be described with reference to a data processing system that uses an encoding processor to perform compression and decompression of an array of data elements that represents an image or graphics texture. However, the concepts described herein can equally be applied to arrangements in which other types of processor, data processing apparatus and/or system are used to perform other types of data processing in respect of other types of data.

FIG. 1 shows schematically an embodiment of a data processing system 100 that can select one or more encoding options and then encode a set of data elements in the manner of the technology described herein.

In this embodiment, the system 100 comprises a data processing apparatus in the form of a system on chip (SoC) 102. The system 100 also comprises off-chip (main) memory 116 and a display device 118. The SoC 102 comprises a central processing unit (CPU) 104, a graphics processing unit (GPU) 106, an encoding processor (encoder) 108, a display controller 110, an interconnect 112 and a memory controller 114.

As is shown in FIG. 1, the CPU 104, GPU 106, encoder 108, and display controller 110 communicate with each other via the interconnect 112 and with the memory 116 via the interconnect 112 and memory controller 114. The SoC 102 also communicates with the display device 118 via the display controller 110.

The GPU 106, under the control of the CPU 104, can generate rendered outputs for display and store the rendered outputs in the memory 116. The display controller 110 can read in rendered outputs stored in the memory 116, and use the rendered outputs to generate output frames for display on the display device 118.

In the following embodiments, the encoder 108 can read in rendered outputs stored in the memory 116, encode (compress) the rendered outputs, and store the encoded (compressed) data in the memory 116. In the following embodiments, the encoder 108 implements an artificial neural network in order to select one or more encoding options to use when encoding a set of data elements of a rendered output. The encoder 108 can also read in encoded data stored in the memory 116, decode (decompress) the encoded data, and store the decoded (decompressed) data in the memory 116 or pass the decoded data to the GPU 106 for further processing (e.g. further rendering, such as computer graphics texture mapping) or to the display controller 110 to generate output frames for display on the display device 118.

Other arrangements for the data processing system 100 would, of course, be possible. For example, a processor other than the encoder 108, such as a dedicated artificial neural network processor, may implement the artificial neural network.

Figure 2:
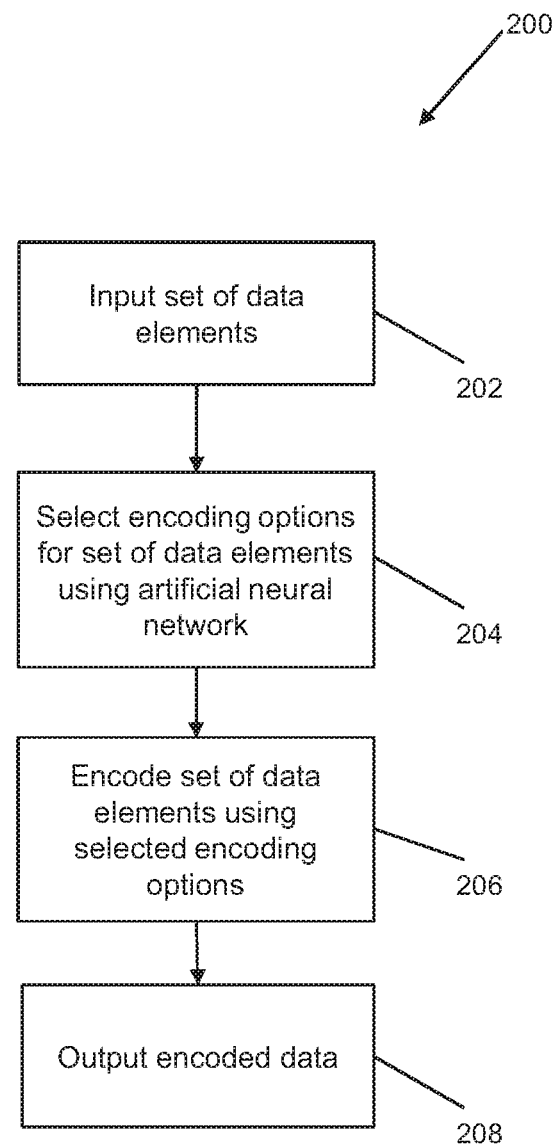
FIG. 2 shows a method of encoding a set of data elements using an encoding scheme according to an embodiment of the technology described herein.

FIG. 2 shows a method 200 of encoding a set of data elements according to an embodiment in which adaptive scalable texture compression (ASTC) is used as the encoding scheme. ASTC is described in more detail, for example, in US 2012/0281007, US 2015/0235384, US 2012/0281006, US 2012/0281005, US 2015/0228050 and US 2012/0281925, the entire contents of which are incorporated herein by reference.

ASTC comprises, inter alia, dividing a larger array of data elements (e.g. corresponding to a part or all of a rendered output (e.g. a "tile")) into distinct smaller arrays or "blocks" of elements and encoding the blocks on a block-by-block basis. Thus, as is shown in FIG. 2, in step 202 a set of data elements, such as a block of data elements, is accordingly input by the encoder 108 into the encoding process.

ASTC also comprises, inter alia, selecting a manner in which to partition the data elements into distinct subsets or "partitions" of elements, and then using a different set of further encoding options for the respective partitions. In this embodiment, a block can be partitioned into 1, 2, 3 or 4 partitions. The number of partitions used (1, 2, 3 or 4) is then indicated by a "partition count" and the allocation of data elements to the partitions is indicated by a "partition index". When later decoding the encoded data, the partition count, partition index and data element location can be input into a hash function that generates a value indicating the partition to which the data element belongs. The further encoding options that can be varied between partitions include the interpolation mode (the use of one or two weight values) and the pair of interpolation endpoints used for interpolating to a value of the set of data elements. Thus, as is shown in FIG. 2, in step 204, these encoding options (partition count, partition index, interpolation mode, and interpolation endpoints) are accordingly selected for the set of data elements by the encoder 108.

In this embodiment, the encoder 108 implements an artificial neural network in order to indicate one or more acceptable partition count and partition index combinations that might be used, but then uses a heuristic branch-and-bound search to select acceptable interpolation modes and pairs of interpolation endpoints to use for each indicated combination. The overall set of encoding options providing acceptable (e.g. optimal or near optimal) encoding performance is then selected for use. In other embodiments, the encoder 108 may also or instead implement an artificial neural network in order to indicate one or more acceptable interpolation modes and/or pairs of interpolation endpoints to use.

ASTC also comprises, inter alia, encoding a value of a data element of the block by determining a weight value to use to interpolate to that value using the selected encoding options. Thus, as is shown in FIG. 2, in step 206, the data elements of the set are encoded by the encoder 108 into a set of weight values using the selected encoding options. Then, in step 208, the encoded data is written out, for example to memory 116.

Figure 3:
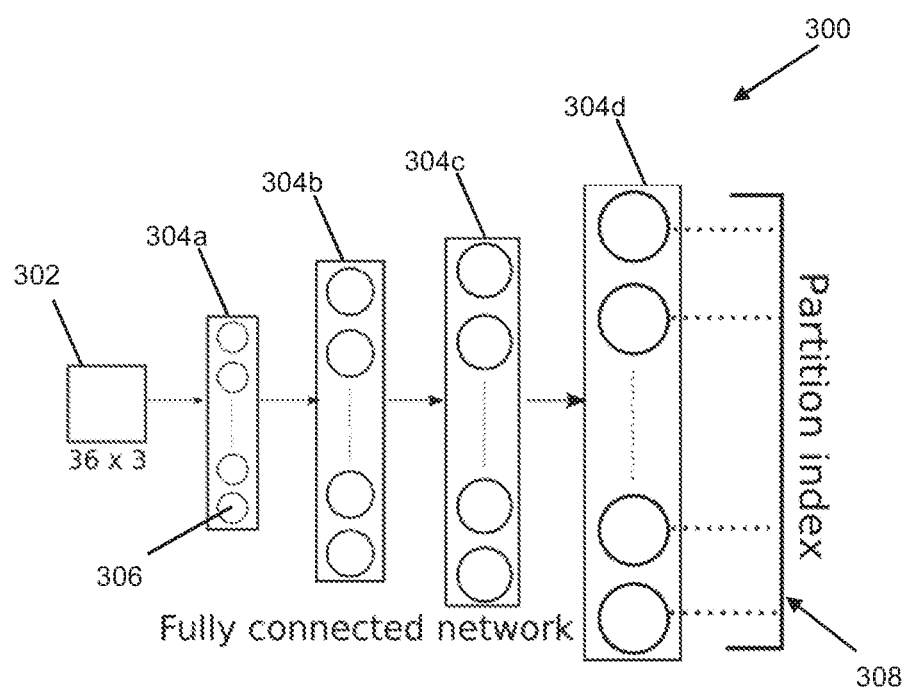
FIG. 3 shows schematically an artificial neural network that can be used to indicate one or more encoding options to use when encoding a set of data elements using an encoding scheme according to an embodiment of the technology described herein.

FIG. 3 shows an artificial neural network 300 that can be used to indicate one or more encoding options to use when encoding a set of data elements using an encoding scheme.

In this embodiment, as is shown in FIG. 3, the artificial neural network 300 comprises plural activation layers including an input layer 304*a*, intermediate or "hidden" layers 304*b*-304*c*, and an output layer 304*d*. The input layer 304*a* receives at respect activation nodes 306 the respective data values of an input set of data elements 302. In this case, the set of data elements 302 comprises a block of 6×6 data elements, with each element representing 3 colour values (RGB).

The artificial neural network 300 further comprises an interconnection between each activation node 306 of the previous layer and each activation node of the next layer, and so on for each pair of adjacent layers. In this embodiment, a respective weight value is applied to a value provided on the input side of each interconnection to produce a weighted value on the output side of the interconnection. The weighted values provided at the activation nodes are then summed, a bias is added, and then an activation function, such as a Sigmoid, Rectified Linear Unit (ReLU) or Scaled Exponential Linear Unit (SELU) function, is applied to produce an activated value on the output side of the activation node.

In this embodiment, the output layer 304*d* provides a result 308 in the form of a set of output values or "scores" in the range 0-1, with each output value corresponding to a particular encoding option, in this case a partition count and partition index combination, to use when encoding the input set of data elements 302. In this embodiment, one or more (e.g. three) partition count and partition index combinations with the highest output value (closest to 1) are selected for further consideration and possible use when encoding the input set of data elements 302.

Other arrangements for the artificial neural network 300 would, of course, be possible. For example, the artificial neural network 300 can comprise a different number of layers and/or a different number of activation nodes at each layer than is shown in FIG. 3. For another example, a convolutional neural network comprising one or more convolutional layers may be used.

The artificial neural network 300 can be trained to operate in an acceptable manner in a conventional way. For example, training the artificial neural network 300 can comprise inputting plural (e.g. hundreds or thousands of) training sets of data elements 302, generating a result 308 for each of the training sets 302, and determining an output error metric for each of the training sets 302 based on a difference between the result 308 and a desired, or at least acceptable, target result for that training set. A collated output error metric, which is derived from the output error metrics for the plural training sets of data elements, can then be back-propagated and the weights and biases of the artificial neural network adjusted accordingly, to thereby reduce the collated output error metric. This training process may be repeated may times over, for example for many different batches of plural training sets of data elements 302 until an acceptable value (e.g. global or local minimum) for the collated output error function is reached.

However, the Applicants have identified that this more conventional approach for training the artificial neural network 300 may not always readily converge to an acceptably trained artificial neural network.

Figure 4:
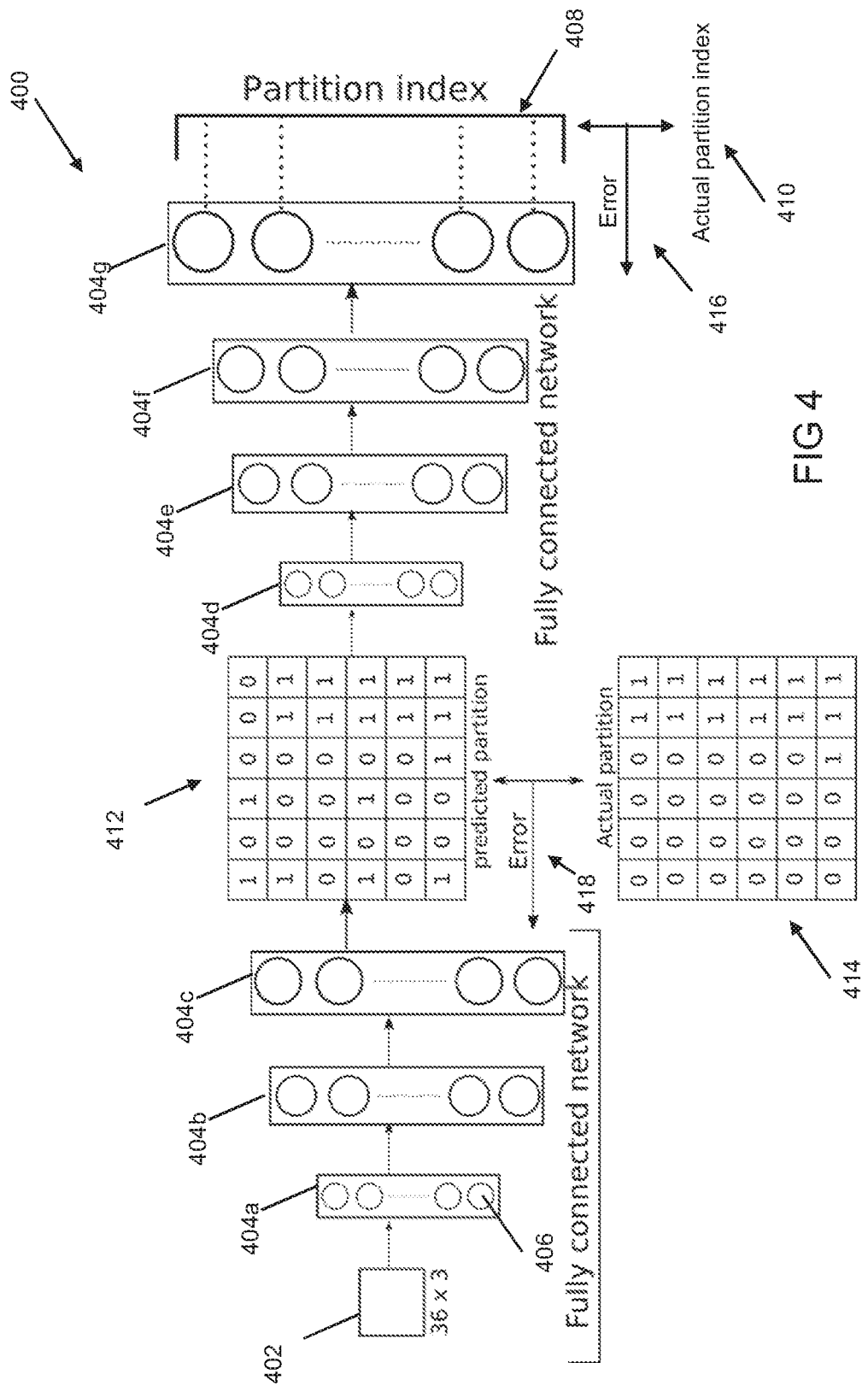
FIG. 4 shows schematically a method of training an artificial neural network to be able to indicate one or more encoding options to use when encoding a set of data elements using an encoding scheme according to an embodiment of the technology described herein.

An improved method of training an artificial neural network is accordingly illustrated in FIG. 4. In this embodiment, the artificial neural network 400 again comprises plural activation layers including an input layer 404a, hidden layers 404b-404f, and an output layer 404g. The input layer 404a again receives at respect activation nodes 406 the respective data values of an input set of data elements 402. In this embodiment, the set of data elements again comprises a block of 6×6 data elements, with each element representing 3 colour values (RGB).

The artificial neural network 400 again further comprises an interconnection between each activation node of the previous layer and each activation node of the next layer, and so on for each pair of adjacent layers. In this embodiment, a respective weight value is again applied to a value provided on the input side of each interconnection to produce a weighted value on the output side of the interconnection. The weighted values provided at the activation nodes are then summed, a bias is added, and then an activation function, such as a Sigmoid, Rectified Linear Unit (ReLU) or Scaled Exponential Linear Unit (SELU) function, is again applied to produce an activated value on the output side of the activation node.

In this embodiment, the output layer 404g again provides a result 408 in the form of a set of output values or "scores" in the range 0-1, with each output value corresponding to a particular encoding option, in this case a partition count and partition index combination, to use when encoding the training set of data elements 402.

In this embodiment, training the artificial neural network can again comprise inputting plural (e.g. hundreds or thousands of) training sets of data elements 402, generating a result 408 for each of the training sets, and determining an output error metric for each of the training sets based on a difference between the result 408 and a target result 410 for that training set.

However, in this embodiment, the training further comprises generating an intermediate result 412 for each of the training sets at an intermediate layer, and determining an intermediate output error metric for each of the training sets based on a difference between the intermediate result 412 and a target intermediate result 414 for that training set. In this embodiment, the target intermediate result 414 is a bit map that indicates, with 0s and 1s, the partitioning that actually corresponds to the target result 410 (i.e. the partitioning that actually corresponds to the partition count and index combination for that training set), but other suitable intermediate results could be used in other contexts.

A collated output error metric 416 is again back-propagated to modify the weights and biases of the artificial neural network 400, but in this embodiment the collated output error metric 416 is back-propagated to the intermediate layer. The back-propagated collated output error metric 416 is then added to a collated intermediate output error 418, which is derived from the intermediate output error metrics for the plural training sets, and this combined or "dual loss" error is then back-propagated from the intermediate layer to the input layer 404a to further modify the weights and biases of the artificial neural network 400.

This training process may again be repeated may times over, for example for many different groups or batches of plural training sets of data elements 402 until an acceptable value (e.g. global or local minimum) for the combined or "dual loss" error function is reached.

The Applicants have identified that this approach of considering an intermediate result can significantly help the training process to converge to a suitably trained artificial neural network, not only in the context of encoding sets of data elements but also in other contexts where a target intermediate result can be inferred that can help to guide an artificial neural network to a desired or at least acceptable target result.

In the above embodiments, the data processing system 100, and in particular the encoder 108, can be used to perform the training of the artificial neural network. However, in other embodiments, a different processor or even a different data processing apparatus and/or system, may be used to perform the training of the artificial neural network. In these embodiments, the parameters for the trained artificial neural network may be provided to the encoder 108 by the different processor, data processing apparatus and/or system. The encoder 108 may then implement the artificial neural network in the manner discussed above.

It can be seen from the above that embodiments of the technology described herein can provide an efficient way of selecting between possible encoding options that can be used to encode a set of data elements. This is achieved in embodiments of the technology described herein by implementing an artificial neural network to generate a result that indicates one or more encoding options to use when encoding a set of data elements using an encoding scheme.

The foregoing detailed description has been presented for the purposes of illustration and description. It is not intended to be exhaustive or to limit the technology to the precise form disclosed. Many modifications and variations are possible in the light of the above teaching. The described embodiments were chosen in order to best explain the principles of the technology and its practical application, to thereby enable others skilled in the art to best utilise the technology in various embodiments and with various modifications as are suited to the particular use contemplated. It is intended that the scope be defined by the claims appended hereto.

What is claimed is:

1. A method of selecting one or more encoding options to use when encoding a set of data elements using an encoding scheme, the method comprising:

training an artificial neural network to be able to indicate one or more encoding options to use when encoding a set of data elements using an encoding scheme, the training comprising:

for each particular training set of data elements of plural training sets of data elements:

inputting, to the artificial neural network, the particular training set of data elements;

implementing the artificial neural network to generate a result that indicates one or more encoding options to use when encoding the particular training set of data elements using the encoding scheme; and determining an output error metric for the particular training set of data elements based on a difference between the result and a target result for the particular training set of data elements; and modifying the artificial neural network so as to reduce a collated output error metric derived from the output error metrics for the plural training sets of data elements;

the method further comprising:

inputting, to the artificial neural network, a set of data elements to be encoded using the encoding scheme; and implementing the artificial neural network to generate a result that indicates one or more encoding options to use when encoding the set of data elements using the encoding scheme.

2. A method as claimed in claim 1, further comprising:
using one or more of the indicated encoding options when encoding the set of data elements.

3. A method as claimed in claim 1, wherein:
the set of data elements represents all or part of an image or graphics texture.

4. A method as claimed in claim 1, wherein:
the encoding scheme comprises an image or graphics texture encoding scheme.

5. A method as claimed in claim 1, wherein:
the encoding scheme allows the set of data elements to be partitioned into distinct subsets of data elements for respective encoding.

6. A method as claimed in claim 1, wherein the result indicates one or more of:
the manner in which to partition the set of data elements for respective encoding; one or more interpolation modes for encoding the set of data elements; and one or more interpolation endpoint values for encoding the set of data elements.

7. A method as claimed in claim 1, wherein the training further comprises:
determining an intermediate error metric for the particular training set of data elements based on a difference between an intermediate result generated at an intermediate layer of the artificial neural network and a target intermediate result for the particular training set of data elements; and
modifying the artificial neural network so as to reduce a collated intermediate error metric derived from the intermediate error metrics for the plural training sets of data elements.

8. A method as claimed in claim 7, wherein:
the target intermediate result for the particular training set of data elements indicates a target partitioning for the particular training set of data elements that corresponds to the target result for the particular training set of data elements.

9. A data processing apparatus for selecting one or more encoding options to use when encoding a set of data elements using an encoding scheme, the apparatus comprising:
training circuitry configured to:
train an artificial neural network to be able to indicate one or more encoding options to use when encoding a set of data elements using an encoding scheme, the training comprising:
for each particular training set of data elements of plural training sets of data elements:
inputting, to the artificial neural network, the particular training set of data elements;
implementing the artificial neural network to generate a result that indicates one or more encoding options to use when encoding the particular training set of data elements using the encoding scheme; and
determining an output error metric for the particular training set of data elements based on a difference between the result and a target result for the particular training set of data elements; and
modify the artificial neural network so as to reduce a collated output error metric derived from the output error metrics for the plural training sets of data elements;

the apparatus further comprising:
input circuitry configured to input, to the artificial neural network, a set of data elements to be encoded using the encoding scheme; and
artificial neural network circuitry configured to implement the artificial neural network to generate a result that indicates one or more encoding options to use when encoding the set of data elements using the encoding scheme.

10. An apparatus as claimed in claim 9, further comprising:
encoding circuitry configured to use one or more of the indicated encoding options when encoding the set of data elements.

11. An apparatus as claimed in claim 9, wherein:
the set of data elements represents all or part of an image or graphics texture.

12. An apparatus as claimed in claim 9, wherein:
the encoding scheme comprises an image or graphics texture encoding scheme.

13. An apparatus as claimed in claim 9, wherein:
the encoding scheme allows the set of data elements to be partitioned into distinct subsets of data elements for respective encoding.

14. An apparatus as claimed in claim 9, wherein the result indicates one or more of:
the manner in which to partition the set of data elements for respective encoding; one or more interpolation modes for encoding the set of data elements; and one or more interpolation endpoint values for encoding the set of data elements.

15. An apparatus as claimed in claim 9, wherein the training further comprises:
determining an intermediate error metric for the particular training set of data elements based on a difference between an intermediate result generated at an intermediate layer of the artificial neural network and a target intermediate result for the particular training set of data elements; and
modifying the artificial neural network so as to reduce a collated intermediate error metric derived from the intermediate error metrics for the plural training sets of data elements.

16. An apparatus as claimed in claim 15, wherein:
the target intermediate result for the particular training set of data elements indicates a target partitioning for the particular training set of data elements that corresponds to the target result for the particular training set of data elements.

17. A non-transitory computer readable storage medium storing computer software code which when executing on a processor of a data processing apparatus performs a method of selecting one or more encoding options to use when encoding a set of data elements using an encoding scheme, the method comprising:
training an artificial neural network to be able to indicate one or more encoding options to use when encoding a set of data elements using an encoding scheme, the training comprising:
for each particular training set of data elements of plural training sets of data elements:
inputting, to the artificial neural network, the particular training set of data elements;
implementing the artificial neural network to generate a result that indicates one or more encoding options to use when encoding the particular training set of data elements using the encoding scheme; and determining an output error metric for the particular training set of data elements based on a difference between the result and a target result for the particular training set of data elements; and modifying the artificial neural network so as to reduce a collated output error metric derived from the output error metrics for the plural training sets of data elements;

the method further comprising:

inputting, to the artificial neural network, a set of data elements to be encoded using the encoding scheme; and implementing the artificial neural network to generate a result that indicates one or more encoding options to use when encoding the set of data elements using the encoding scheme.

\* \* \* \* \*